March 1, 1949.                W. E. HODGKINSON                 2,463,460
                          THRUST BALANCED SCREW PUMP Filed Oct. 2, 1946

INVENTOR.
                                  WILLIAM E. HODGKINSON
                               BY
                                  Warren S. Ostow
                                        ATTORNEY Patented Mar. 1, 1949

2,463,460

UNITED STATES PATENT OFFICE 2,463,460

THRUST BALANCED SCREW PUMP

William E. Hodgkinson, Ridgefield Park, N. J., assignor to Sier-Bath Gear & Pump Co., Inc., North Bergen, N. J., a corporation of New Jersey Application October 2, 1946, Serial No. 700,666

12 Claims. (Cl. 103—128)

The invention relates in general to an improvement in screw pumps and relates specifically to an improvement in screw pumps of the Quimby type, such as is illustrated in the patent to Gilbert Rathman, 1,645,349, October 11, 1927.

Such pumps are designed so that the fluid propelling and intermeshing screws fit more or less snugly for rotary movement in a shell bored to provide a double cylindrical form of center bearing in which the screws fit more or less snugly. The ideal operative condition is that the axis of each screw and its associated shaft be fixed to coincide exactly with the axis of the bearings, end and center, in which it turns. It has been found that after such devices have been in use for a while the screws, and with them their associated shafts, tend to shift laterally towards the side of the pump casing or screws which contains the fluid pressure discharge opening of the pump, and thus in a direction away from the suction inlet opening of the pump. This, of course, develops an objectionable and wasteful action of the screws, in that it creates friction between the shafts and their end bearings and causes wear on one side of the central screw bearing with the resulting possibility of leakage pass the screws. Any such shifting of screw axis results in the development of undesired clearance between the screws and their center bearings or housings which eventually reduces the efficiency of the pump.

One of the objects of the invention is to maintain the screws and shafts in their initial position, each centered in its respective bearing, and thus to avoid the above objections to present forms of screw pumps in their screw shifting or even tending to shift laterally.

Broadly this object is attained by installing in a pump of this character, a compensating device operatively responsive to the difference in fluid pressures at the so-called suction or reduced pressure at the intake opening and the greater pressure at the discharge opening, and with the compensating device disposed to bear on the screws in the direction to resist their tendency to shift laterally as above described, so that the greater becomes the tendency of the screws to displace their axis by reason of the fluid pressure therein, the greater becomes the force acting through the compensating device to resist any such tendency of the screws to shift off center.

Various other objects and advantages of the invention will be in part obvious from an inspection of the accompanying drawings and in part will be more fully set forth in the following particular description of one form of device embodying the invention, and the invention also consists in certain new and novel features of construction and combination of parts hereinafter set forth and claimed.

Figure 3:
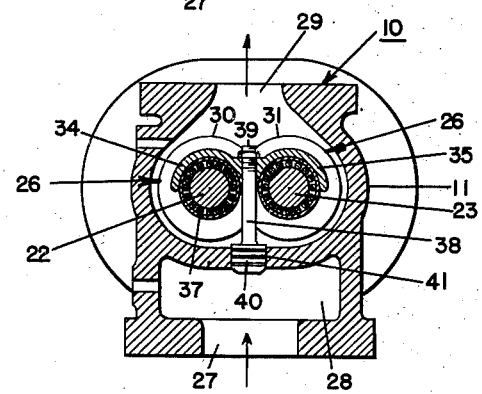
Fig. 3 is a transverse sectional view taken on lines 3—3 of Figs. 1 and 2, looking in the direction indicated by the arrows of Fig. 2.

In the drawings there is shown for the most part a screw pump of the Quimby type comprising a casing 10, the central shell forming part 11 of which is closed at opposite ends by interiorally recessed heads 12 and 13. Two screw shafts are located in parallel relation in the casing, one shaft 14 being the driven shaft, journalled in outwardly closed bearings 15 and 16 in the two heads, and the other being the driving shaft 17 journalled in bearings 18 in head 12 and in a stuffing box bearing 19 in the head 13. The two shafts upon which are mounted the usual pairs of intermeshing screws 20—21 and 22—23 are geared together by two sets of V-toothed gears 24 and 25 one set at opposite ends of the shell. Also following conventional practices the shell 11 is bored therethrough longitudinally from end to end to form a center bearing 26 in which the screws 20—23 are mounted with a snug fit for free rotary movement about their respective axis of rotation. The bearing is actually two cylindrical bores one for the pair of screws on each screw shaft and with the bores disposed side by side and slightly overlapping as best shown in Fig. 3.

Figure 1:
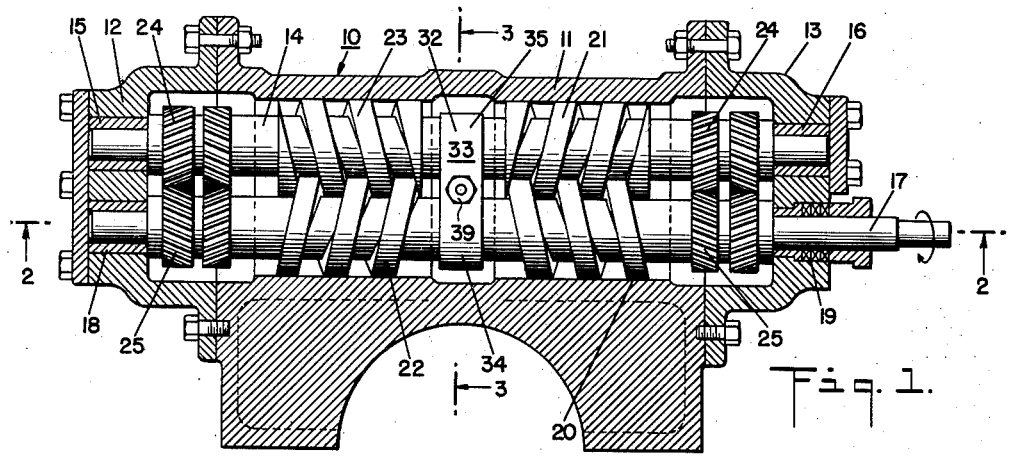
Fig. 1 is a view in longitudinal, horizontal section of a screw pump of conventional design and disclosing in plan a preferred embodiment of the invention.
Figure 2:
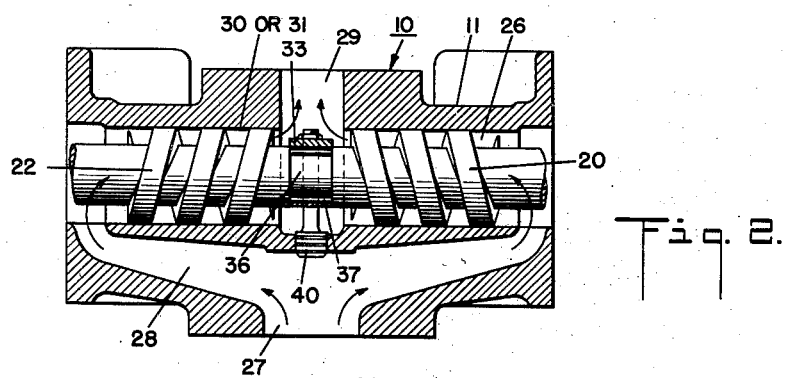
Fig. 2 is a longitudinal sectional view through the shell of Fig. 1 and taken axially of either one of the screw shafts, such as on the line 2—2 of Fig. 1.

The shell 11 is provided on one side thereof and adjacent its mid-length with a suction inlet opening 27, which leads by means of a wide spreading Y-shaped manifold 28 to the opposite open ends of the bearing 26 as shown in Fig. 2. The shell is provided on its side opposite the inlet opening 27 with a centrally located pressure discharge opening 29 of smaller cross section than the inlet opening 27. The device as thus far described is of conventional design and has been illustrated simply to show one situation where the compensating device herein featured may be utilized.

In such devices during the pumping operation fluids admitted through the inlet opening 27, flow horizontally from the open ends of the bearing 26 as shown in Fig. 2 along the lengths of the co-acting left screws 20—21 on one side and along the co-acting right screws 22—23 along the other side of the medial transverse plane and unite and flow out through the discharge opening 29 as indicated by the curved arrows. The screws on both sides of the medial plane have a tendency when so operating to scrape along the arched upper walls 30—31 of the bearing 26 and the greater becomes the difference in pressure between the inlet and discharge openings the more forcibly do the screws thus bear on and scrape against these walls 30—31. The present disclosure relates particularly to a floating compensating device for automatically releasing or counteracting this tendency of the screws to move towards these curved sides of the bearing 26.

The compensating device, designated generally by the reference character 32, may be regarded as a separate article of manufacture and installed in the pumps of the Quimby type as an attachment when the pumps have been modified as herein suggested to receive such attachment. The compensating device constitutes a differential piston and comprises a head or bonnet 33 in the form of two arched yokes, one of which 34 overlaps the shaft 22 and the other 35 overlaps the shaft 23 as shown in Fig. 3. Preferably the shafts are each reduced in diameter between their screws 20—22 and 21—23 at the places overlapped by the yokes to form annular channels 36 in each of which is located a set of roller bearings 37. These roller bearings are of the conventional caged design and are utilized to assist in minimizing any tendency of the compensating device to interfere with the desired freedom of rotation of the screw shafts. The head 33 is disposed between the inner discharge ends of the four screws and the discharge opening 29 and with the other parts of the device 32 within the outline of the center bearing 26 is thus exposed to and subject to the pressure effect of the pumped fluid as it is discharged from the pump.

The compensating device also includes a long pin-like plunger-rod 38, one end of which extends through the head 33 and is rigidly secured thereto by nut 39 accessible through the opening 29. The opposite end of the plunger rod is provided with a piston head 40 which is slidably mounted in an aperture 41 formed in the side of the bearing 26 which faces the suction inlet opening 27. The lower end of the head 40 as viewed in Figs. 2 and 3 is thus exposed to the suction or reduced pressure effect on the fluid as it is drawn into the pump through the inlet opening 27.

Preferably the cylindrical head 40 is formed with side gaskets or is otherwise constructed, to provide a snug sliding fit in the aperture 41, and at the same time to avoid leakage through the aperture 41.

In operation and assuming the screws to be active it will be understood that the pressure acting on the large head 33 of the compensating device will be substantially balanced on opposite sides of the yokes 34 and 35. The downward force then of the positive discharge pressure at the opening 29 will act on the exposed area of the rod 38 plus the area at the top of the piston head 40 and this downwardly directed force will be greater than the relatively negative pressure force acting on the under side of the head 40, with the result that the head 33 bears through it yokes 34 and 35 directly on the midportion of each screw shaft. This imposes a load on each shaft acting in the direction downwardly as viewed in Figs. 2 and 3 and this resists the usual tendency of these screws to raise against the walls 30 and 31. The greater becomes the difference in pneumatic pressure between the inlet and outlet openings, the more forcible becomes the action of the compensating device in resisting the shifting of the screw shafts. Thus the reaction on the screw shafts is always equal to action irrespective of the degree of pressure present in the pump.

While the description for convenience of expression refers to the shift of the screws as if the displacement was of some moment, it is appreciated that any movements of the shafts are of very small magnitude, perhaps not even measurable in the beginning and it would be more accurate to refer to the tendency of the screws to shift laterally as a strain rather than as an actual bodily movement.

Several results followed from the use of such a compensating device in addition to the avoidance of wear on the walls 30—31. For instance, known forms of such pumps can be readily modified to accommodate the compensating device; the screw shafts are held balanced at their centers, floating in what might be considered as a very thin air bearing; leakage past the screws is avoided even after extensive use for a long period of time; friction and thus heating of the pump has been minimized; the life of the pump increased; the screws are utilized solely to force the fluid through the pump and as they do not act as bearings their retardance is minimized if not entirely eliminated, and in general the overall efficiency of the pump is improved, all due to the clearance thus provided between the screws and the bores or bearings of the pump in which they operate.

I claim:

1. In a screw pump of the type described, the combination of a casing with detachable heads adapted as usual to receive two pairs of intermeshing right and left screws and providing the usual suction and discharge opening, two parallel shafts for carrying the screws which are journalled, one shaft journalled at its ends in outwardly closed bearings in the two heads and the other shaft journalled in an outwardly closed bearing in one head, and in a stuffing box bearing in the other head, at least one pair of intermeshing gears which are fixed upon and gear together the two shafts, each of said shafts being reduced in diameter, adjacent their midlengths and between its associated screws, two sets of roller bearings, one for each reduced portion of each shaft and encircling the same, and a floating member free to move transversely of the shafts, comprising a relatively large head exposed to the pressure in the discharge opening and forming two yokes, one overlapping and bearing on one of the roller bearings and the other overlapping and bearing on the other roller bearing, and said compensating device including a plunger rod for moving the yokes into bearing engagement with the pair of roller bearings, and said plunger rod provided at the end opposite the head with a piston exposed to the reduced pressure condition at the suction opening of the casing whereby the compensating device is responsive to the difference in pressures at the suction and discharge openings.

2. In a screw pump, the combination of a casing having a suction inlet opening and a pressure discharge opening, said openings being disposed at the midlengths of the casing and at opposite sides thereof, a portion of the casing being bored to provide a screw bearing, opposite ends of said screw bearing being opened to the suction inlet opening and said screw bearing provided adjacent its center with a pair of openings disposed facing each other transversely of the length of the screw bearing, one of said pair of openings being exposed to the pressure of the discharge opening and the other of said pair of openings being exposed to the pressure at the suction inlet opening of the pump, a pair of intermeshed screws journalled for free rotary movement in said bearing, the screws when operative having a tendency to scrape on the side of the bearing nearest the discharge opening, a compensating device operative to resist the tendency of the screws so to scrape on the bearing, said device having at one end a pair of yokes overlapping the screws and disposed in that one of the transverse openings which is at the outlet opening and said compensating device including a plunger with one end secured rigidly to the pair of yokes and having its other end slidably guided in the other of the transverse openings and exposed to the suction effect in the inlet opening.

3. In a screw pump, the combination of a casing provided with heads at opposite ends thereof and provided on one side with a suction inlet opening and on its other side with a pressure discharge outlet opening, a pair of parallel shafts journalled in the heads and each shaft provided with a pair of screws with the screws of one shaft intermeshing with the screws of the other shaft, means intergearing the two shafts to drive one from the other, said casing providing a screw bearing in which the screws fit for rotary movement, and a compensating device for bearing on the shafts adjacent their midlengths to force them in a direction from the discharge opening towards the inlet opening, said device having one end exposed at all times to the reduced pressure condition in the inlet opening and its opposite end exposed at all times to the increased pressure condition at the discharge outlet opening.

4. The device defined in claim 3, and in which anti-friction devices are interposed between the compensating device and each of the shafts.

5. In a screw pump, the combinaton of a casng provided with an inlet opening and with a discharge opening, a pair of intermeshed screws mounted for rotary movement in the casing for passing fluid therethrough from the inlet opening to the outlet opening, and which screws have a tendency when active to strain in one lateral direction, and a floating compensating device within the casing having one end exposed to the high pressure condition at the outlet opening and its opposite end exposed to the low pressure condition at the inlet opening, whereby the device is responsive to the difference of pressures at the openings, and said device being operatively connected to the screws to exert a pressure theron in the direction opposite to said first named strain when reacting to said difference in pressures.

6. The combination in a screw pump with its usual casing having inlet and outlet openings and a pair of intermeshing screws, of a compensating device constituting a differential piston operatively responsive to the difference in fluid pressures at the said openings and said piston including at one end a pressure head exposed to the outlet opening and bearing on one side of each of the screws and at its other end a piston head exposed to the inlet opening.

7. In a screw pump with its usual casing having inlet and discharge openings and intermeshing screws journalled therein, of a floating compensating device contained in the casing, operatively controlled by the difference in pressures at the openings and bearing on the screws in a tendency to move said screws in a lateral direction.

8. In a screw pump, the combination of a casing having a fluid inlet and a fluid discharge opening, a set of propelling screws journalled therein and having a tendency when operating to strain in one lateral direction and a load creating device operatively connected to the screws to bear on the same and thus strain them in a contra-direction thereby tending to maintain the axes of the screws fixed relative to the casing.

9. An article of manufacture constituting an attachment for installation in a screw pump having a pair of screw-carrying parallel shafts, comprising a compensating device having a piston head at one end and a pressure head at the other end, said pressure head formed of two arched yokes. fashioned to conform to one side of each of the two shafts.

10. The device defined by claim 9 and which includes a pair of roller bearings, one for each yoke, fashioned to be located on the shafts of a screw pump and to be fitted to its associated yoke.

11. In a screw pump, the combination of a casing provided with a screw-containing bearing, a pair of intermeshing screws mounted in the bearing for rotation each about its own axis, journal bearings for mounting the screws to rotate each about its own axis and operating to fix the axes of the screws, said screw bearing being wide open at the intake ends of the screws and said casing provided on one side thereof with a discharge opening open to the discharge ends of the screws, a differential piston slidably guided in the casing for movement in a direction transversely of the lengths of the screws, said piston having one end exposed to the pressure at the intake ends of the screws and its other end exposed to the pressure at the discharge end of the screws, said piston being operatively responsive to the difference in pressures at opposite ends of the screws and said piston being operatively connected to both screws to move the same as a unit laterally in a direction away from the side of a casing having the discharge opening.

12. In a screw pump, the combination with a casing provided with a fluid discharge opening located at one side of the casing and with a fluid inlet opening, said casing provided therein with a conduit connecting the openings, a part of said conduit forming a screw bearing, a pair of intermeshing screws mounted in the screw bearing for rotary movement with a snug but freely running fit for passing a fluid through the conduit, said screws exhibiting a tendency when functioning to strain laterally in the direction toward the fluid discharge opening and in doing so exhibiting a scraping action on the wall outlining the screw bearing, journaling means for mounting opposite ends of the screws in the casing, and pressure creating means disposed in spaced relation to the journaling means and acting laterally on the screws in a direction opposite to the direction they tend to strain.

WILLIAM E. HODGKINSON.

No references cited.